T. A. EDISON.
METHOD OF PRESENTING THE ILLUSION OF SCENES IN COLORS.
APPLICATION FILED JUNE 16, 1913.
1,138,360. Patented May 4, 1915.
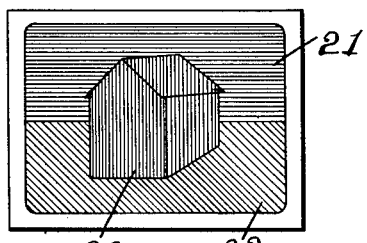
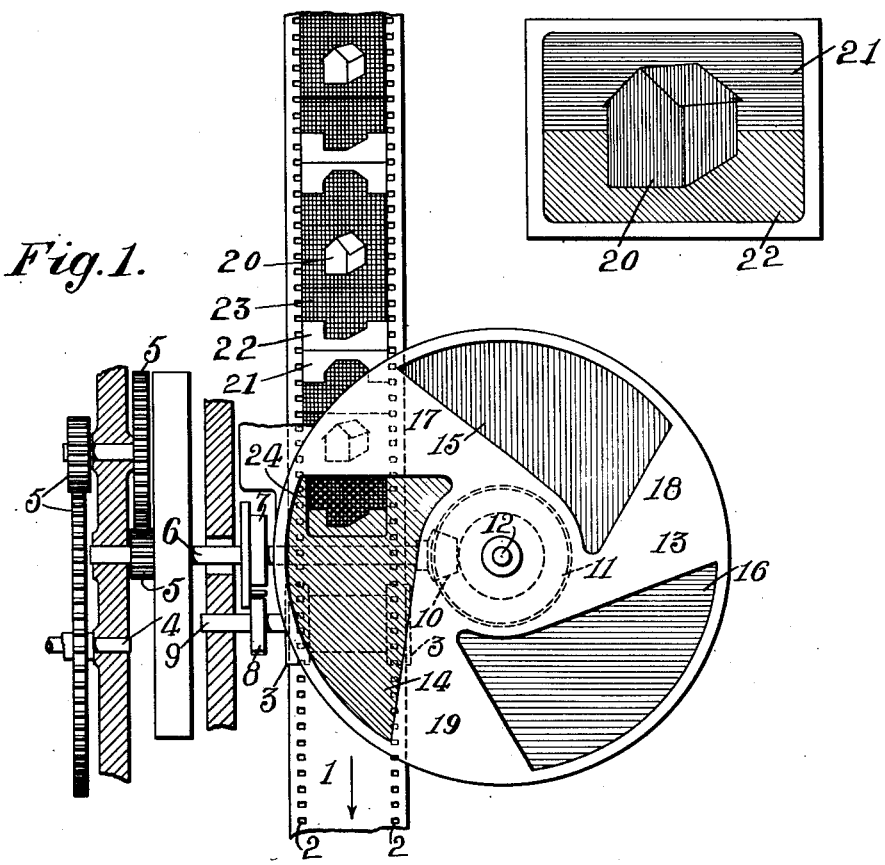
WITNESSES:
William A. Hardy
J. A. Brophy
INVENTOR
Thomas A. Edison
BY Dyer & Holden
his ATTORNEYS

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

METHOD OF PRESENTING THE ILLUSION OF SCENES IN COLORS.

1,138,360.      Specification of Letters Patent.      Patented May 4, 1915.

Continuation of application Serial No. 728,370, filed October 29, 1912. This application filed June 16, 1913. Serial No. 773,843.

*To all whom it may concern:*

Be it known that I, THOMAS A. EDISON, a citizen of the United States, and a resident of Llewellyn Park, West Orange, Essex county, New Jersey, have invented certain new and useful Improvements in Methods of Presenting the Illusion of Scenes in Colors, of which the following is a description.

This application is a continuation of my application Serial No. 728,370, filed October 29, 1912, the latter application being a division of my application Serial No. 448,292, filed August 13, 1908.

My invention relates to the method of presenting the illusion of scenes in colors and more particularly to improvements in the art of exhibiting moving pictures by means of which the effect of animated pictures in colors true to life is produced on the retina of an observer.

The method consists broadly in momentarily projecting an image of all the elements of a scene of one fundamental color in that color; and of thereafter successively projecting images which are superimposed upon, or registered with, the first image on the retina of the beholder, of those elements of the scene of different fundamental colors in their proper colors respectively. These successive images are projected at such a rate that, in accordance with the phenomenon of persistence of vision, the former images persist in the vision of the beholder until after the last image of the series has been projected upon the screen, so that the whole series of images thus projected will register and blend together on the retina of the eye of the beholder, causing an image of the complete scene in its proper and true colors to be formed on the retina. In the case of moving pictures, the scene thus produced, composed as it is of a plurality of parts of scenes, each one consisting of those elements of the scene of one fundamental color, corresponds to a single instantaneous scene in the case of ordinary black and white moving pictures, and is followed on the film by a succession of further scenes similarly composed each of its corresponding plurality of color elements showing slight variations in movement of the scenes, so that the effect of continuous movement and animation is produced, as is common in the art.

More specifically, my invention consists in producing a negative by photographing upon a sensitized film without the use of color screens, filters or the like, a succession of scenes, as is common in the moving picture art, except that the scenes are photographed at such a great speed that a succession of three scenes, in case it is desired to break up the scene into its three fundamental colors, may be superimposed one upon the other without perceptible change in outline. This series of views is then considered as one view to be decomposed into its various color elements. A positive film is then prepared from the negative in the usual way, and the positive thus obtained is so treated that all the portions of each scene, except those representing the elements of that scene which are of the color which it is desired that scene should show, are rendered opaque. This may be done in various ways, but is preferably done by painting or blocking out the portions of the film which it is desired to render opaque, with a dark pigment. From the treated or blocked out positive a sub-negative is prepared, preferably by contact printing, and from the sub-negative any number of positives may be prepared in any suitable manner, preferably by contact printing. Images are now projected through the successive views on a positive film prepared from such a sub-negative, each image being projected through a color medium appropriate thereto and the images of the successive views are projected at such a rate that all the differently colored images of each series blend in the vision of the beholder to form the complete scenes in their natural colors. This last step is preferably carried out by feeding the film intermittently past the exposure opening of a moving picture projecting apparatus, while at the same time, a shutter, carrying sections of translucent or transparent material, such as glass of various colors, as green, red, and blue, is caused to rotate in front of the display opening continuously, the feed of the film being so adjusted that that part of a scene which should be shown, for example, in green, is exhibited in front of the display window during the time in which the green glass or other transparent material of the shutter is passing before the same. The opaque portion of the shutter then cuts off the view momentarily while the film is being fed forward the next section, whereupon another view, displaying, for example, those elements of the scene which should be shown in red, is displayed at the display window while at the same time the transparent red portion of the shutter is passing across the window. After this, the opaque portion of the shutter again cuts off while the film is being fed forward another step to display the blue portion of the scene under the blue glass of the shutter. By this means the source of light behind the film shines through the elements of a scene which should be exhibited in green and also passing through green glass produces an image on the screen of all the green elements of the picture. Similarly, images of all the red elements and images of all the blue elements registered in their proper relation to each other in the picture, are produced on the retina of the beholder's eye in such rapid succession that all persist in the vision to form one picture.

In order that my invention may be better understood, attention is directed to the accompanying drawing, forming part of this specification, and in which:

Figure 1 represents a detail view of a section of a positive film produced in accordance with my invention, and the shutter and part of the feed mechanism in section of a motion picture projecting apparatus by means of which the pictures on the film may be exhibited; and Fig. 2 represents the image of the combined picture produced by the projection of three partial elements in colors upon the screen.

Referring to Fig. 1, the film 1 is provided with rows of perforations 2, and is fed by means of sprockets or feed wheels 3, engaging these perforations as is usual. The power is derived from the crank shaft 4 by means of suitable gearing 5 connecting the crank shaft 4 and a shaft 6, and an intermittent feeding mechanism 7 and 8, of any usual construction, as the well known Geneva stop, between the shaft 6 and shaft 9 carrying the feed wheels 3. A bevel gear 10 on shaft 6 meshes with a bevel gear 11 on a shaft 12, which carries the shutter 13 and provides a continuous rotation for the latter. The shutter is provided with portions 14, 15 and 16 of transparent glass, or other materials of different colors. Between these transparent portions of the shutter are opaque portions 17, 18 and 19.

In the scene represented as thrown upon the screen in Fig. 2, the house 20 is shown, for example, in red, against a background of blue sky 21, and green lawn 22. A negative film of this scene is first produced by making a series of exposures thereof on successive sections of a sensitized film and developing and fixing the latter in the usual manner. From this negative a positive film is then prepared in the usual way. On the positive film so obtained in one section thereof, the portion of the scene to be exhibited in green, that is, the lawn 22, is left untouched, while the remainder of the section corresponding to part 23 of the positive film shown in Fig. 1 is painted out, or otherwise rendered opaque. In the following section of this positive film, that part of the scene to be displayed in red, namely, the house 20, is left untouched, while the remainder of the scene is rendered opaque and in the following section of this positive film, the blue sky 21 is left untouched while the remainder of the section is rendered opaque. The following sections of this positive film, in the case of a motion picture, are similarly treated. From the treated or blocked out positive a sub-negative is prepared, and from this sub-negative the black and white positive film 1 shown in Fig. 1 is produced. It will be obvious that any number of these positives may be printed from the sub-negative.

In operation, the film 1 is so adjusted in the machine that the part of the scene which should be displayed in green, as for example, the green lawn in the foreground in the picture shown in Fig. 2, is caused to appear at the display opening 24 just as the section 14 of the shutter composed of green glass, is passing before the window 24. This image is displayed throughout the transit of section 14 across the window 24 and immediately upon the cutting off of the view by opaque member 17 of the shutter, the film is fed forwardly in the direction of the arrow, so that the succeeding section, showing the house 20, appears at the display opening just as transparent section 15 of the shutter which is red, begins to cross the display opening. Similarly, after this view has been cut off, section 21 showing the sky, appears at the display opening and is exhibited through the blue glass 16 of the screen. These three elemental images register in the vision of the beholder as is shown in Fig. 2, and are produced with such rapidity that the images of the first two sections shown persist in the vision of the beholder while the third section is being exhibited, thus creating the illusion of a complete picture of a red house against a background of blue sky and green lawn. To produce this effect successfully, the apparatus should be operated at a considerable speed.

It is, of course, understood that the invention is equally applicable to the projection of isolated views of objects having no motion, or of views showing objects in motion. It is evident also that in the example given in the drawings, the transparent sections of the shutter might have been any colors and might have been as well two or four or of another number other than three, although, of course, it is evident that if the number of views into which a picture is divided is made too great, the speed with which the pictures would have to be taken in order to obtain views with practically no movement between the same for the different color elements and also the exhibiting of the same in the machine in order that the law of persistence of vision might be complied with, would be too great to be practicable. In the example shown, the objects are each shown in the solid color belonging to one transparent section of the shutter. It is, however, apparent that combinations of color may be formed on the retina of the beholder by the superposition of images of different colors upon the retina within the time limit allowed by the phenomenon of persistence of vision. For example, red and blue lights mingled produce purple, red and green produce yellow, blue and yellow produce a pale pink, etc. Accordingly, with a shutter carrying transparent sections of green, red and blue, it would be impossible to show a yellow object, for example, or yellow elements of the picture, by so applying the pigment to the positive prepared from the first negative, as to render only the parts of the picture which should produce yellow effect on the eye of the beholder, transparent in the sections of the positive film prepared from the sub-negative which should be exhibited under the green and red sections of the shutter successively. For considerations such as these, it is apparent that it is preferable to use for the shutter three transparent sections of those colors which as lights mingle together to produce white. It is apparent that it is possible, by my invention, to produce complete images of scenes in a great variety of shades and colors, by rendering opaque all those portions of the film in every section thereof which should not transmit the light of the color appropriate to that section and that by making the transparent portions of the film quite small, a showing of objects in many changing colors may be secured. With the apparatus shown in the drawings, the shutter is rotated one-third of a revolution for each successive forward feed of the film, one complete revolution of the shutter accompanying a forward feed of three pictures or sections of the film, which, however, produce only one complete picture in colors, equivalent to the usual instantaneous scene in black and white which accompanies the rotation of a shuttter in the usual practice of the moving picture art.

It is apparent that my method may be carried out by numerous other types of projecting apparatus and shutters than those shown in the drawings. It is also evident that in carrying out my method it is not essential that a shutter be provided carrying transparent sections of different colored glass or similar material, as shown, since any means might be employed to cause the transmission of light of the desired color through a transparent portion of the film at the proper time. Any means by which the light is, with a proper periodicity, broken up into the desired colors, will suffice.

Having now described my invention, what I claim and desire to protect by Letters Patent is as follows:—

1. The method of making a photographic film consisting in producing a negative by photographing at spaced intervals upon a sensitized film a series of images of an object or scene, preparing a positive film therefrom, blocking out solidly on the positive thus obtained all the portions of each image other than those representing the portion of the scene photographed of a certain color, different in each view, making a sub-negative from the blocked out positive, and preparing a positive from the sub-negative, substantially as described.

2. The method of making a photographic film consisting in producing a negative by photographing at spaced intervals upon a sensitized film a plurality of series of images of a moving scene, preparing a positive film therefrom, blocking out solidly on the positive thus obtained all the portions of each image other than those representing the portion of the scene photographed of a certain color, different in each view of a series, and recurring periodically in the various series, making a sub-negative from such blocked out positive, and preparing a positive from the sub-negative, substantially as described.

3. The method of presenting the illusion of a scene in color consisting in producing a negative by photographing at spaced intervals upon a sensitized film a series of images of the scene, preparing a positive film therefrom and blocking out solidly on the positive thus obtained all the portions of each image other than those representing the portion of the scene photographed of a certain color, making a sub-negative from such blocked out positive, preparing a positive film from the sub-negative, and projecting the series of images through said last named positive film, each image being projected through a color medium appropriate thereto at such a rate that all the differently colored images of the series blend in the vision of the beholder to form the complete scene in its natural colors, substantially as described.

4. The method of presenting the illusion of animated scenes in color, consisting in producing a negative by photographing at spaced intervals upon a sensitized film a plurality of series of images of a moving scene, preparing a positive film therefrom and blocking out solidly on the positive thus obtained all the portions of each image other than those representing the portion of the scene photographed of a certain color, different in each view of a series, and recurring periodically in the various series, making a sub-negative from such blocked out positive, preparing a positive film from the sub-negative, and projecting the series of images through said last named positive film in a moving picture projecting apparatus, each image being projected through a color medium appropriate thereto at such a rate that all the differently colored images of each series blend in the vision of the beholder to form the complete scenes in their natural colors, substantially as described.

5. The method of presenting the illusion of animated scenes in color, consisting in producing a black and white negative by photographing at spaced and rapidly succeeding intervals upon a sensitized film a plurality of series of images of a moving scene, preparing a black and white positive therefrom, blocking out solidly on the positive thus obtained all the portions of each image other than those representing the portion of the scene photographed comprising a certain color, different in each view of a series and recurring periodically in the various series, making a black and white sub-negative from such blocked out positive, preparing a black and white positive film from the sub-negative, and projecting the series of images through said last named positive film, each image being projected through a color medium appropriate thereto at such a rate that all the differently colored images of each series blend in the vision of the beholder to form the complete scenes in their natural colors, substantially as described.

6. The method of making a photographic film, consisting in producing a photograph by photographing at spaced intervals upon a sensitized film a series of views of an object or scene, blocking out solidly on the photograph thus obtained all the portions of each view other than those representing the portion of such object or scene of a certain color, different in each view, and producing a "black and white" photographic positive by the use of the blocked out photograph, substantially as described.

This specification signed and witnessed this 13 day of June 1913.

THOS. A. EDISON.

Witnesses:
WILLIAM A. HARDY,
MARY J. LAIDLAW.